United States Patent
Patel et al.

(10) Patent No.: US 11,590,832 B1
(45) Date of Patent: Feb. 28, 2023

(54) VEHICLE DOOR REINFORCEMENT ASSEMBLY

(71) Applicant: Ford Global Technologies, LLC, Dearborn, MI (US)

(72) Inventors: Deepak Patel, Canton, MI (US); Zhibing Deng, Northville, MI (US); Joseph E. Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/509,331

(22) Filed: Oct. 25, 2021

(51) Int. Cl.
| | |
|---|---|
| *B60J 5/04* | (2006.01) |
| *B62D 25/04* | (2006.01) |
| *B62D 25/02* | (2006.01) |

(52) U.S. Cl.
CPC ............ *B60J 5/0459* (2013.01); *B60J 5/042* (2013.01); *B60J 5/0427* (2013.01); *B60J 5/0456* (2013.01); *B62D 25/025* (2013.01); *B62D 25/04* (2013.01)

(58) Field of Classification Search
CPC ........ B62D 25/025; B62D 25/04; B60J 5/042; B60J 5/0422; B60J 5/0423; B60J 5/0427; B60J 5/0456; B60J 5/0459
USPC ............ 296/193.06, 203.01, 3, 187.12, 202; 293/128
See application file for complete search history.

(56) References Cited

U.S. PATENT DOCUMENTS

| | | |
|---|---|---|
| 4,221,410 A | 9/1980 | Dawson |
| 4,437,697 A | 3/1984 | Hinijos |
| 4,648,644 A | 3/1987 | Swanson et al. |
| 7,354,083 B1 | 4/2008 | Obermann |
| 7,472,922 B2 | 1/2009 | Wu et al. |
| 10,632,951 B2 | 4/2020 | Nusier et al. |
| 10,906,488 B2 | 2/2021 | Santiago |

FOREIGN PATENT DOCUMENTS

| | | |
|---|---|---|
| DE | 102017005759 A1 | 12/2017 |
| EP | 0734910 A2 * | 3/1996 |
| GB | 2579382 A | 6/2020 |

* cited by examiner

*Primary Examiner* — Dennis H Pedder
(74) *Attorney, Agent, or Firm* — Frank A. MacKenzie; Bejin Bieneman PLC

(57) ABSTRACT

An assembly for a vehicle includes a vehicle body including a sill and a pillar extending upwardly from the sill defining a door opening. A member is rotatably supported by the sill and is rotatable relative to the sill from an undeployed position to a deployed position. A link is rotatably supported by the pillar and the member. A pyrotechnic actuator is supported by the vehicle body and is connected to the member.

17 Claims, 7 Drawing Sheets

VEHICLE DOOR REINFORCEMENT ASSEMBLY

BACKGROUND

A vehicle may include features that increase the ease of occupant ingress and egress. For example, a vehicle may not include a vertical, body-mounted pillar between the front pillar and rear pillar of a door opening. Such vehicles may include two doors that meet at the location traditionally occupied by the vertical, body-mounted pillar when in a closed position. Not having a vertical, body-mounted pillar between the front pillar and rear pillar of a door opening allows for unobstructed ingress and egress when the doors are in an open position.

DETAILED DESCRIPTION

Figure 1:
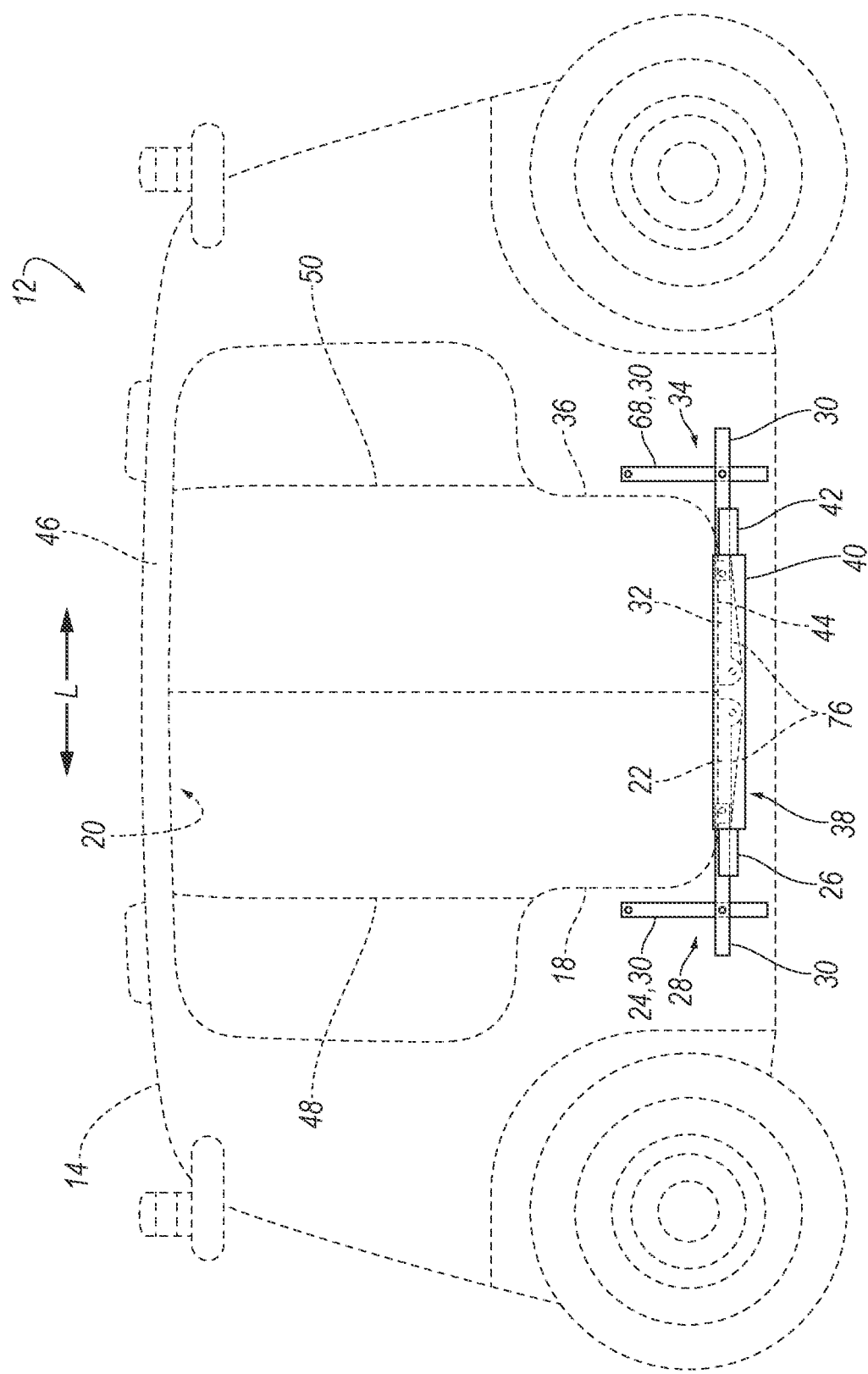
FIG. 1 is a perspective view of the vehicle with a body shown in broken lines to show a reinforcement assembly in an undeployed position.

An assembly includes a vehicle body including a sill and a pillar extending upwardly from the sill defining a door opening. The assembly includes a member rotatably supported by the sill. The member is rotatable relative to the sill from an undeployed position to a deployed position. A link is rotatably supported by the pillar and the member. A pyrotechnic actuator is supported by the vehicle body and connected to the member.

The member may be recessed relative to the door opening in the undeployed position and may be across the door opening in the deployed position. The link may be recessed relative to the door opening in the undeployed position and is across the door opening in the deployed position. A second member may be rotatably coupled to the sill and may be rotatable relative to the sill from an undeployed position to a deployed position. The second member may be recessed relative to the door opening in the undeployed position and may be across the door opening in the deployed position. The first member and the second member may engage each other in the deployed position. The vehicle body may include a second pillar extending upward from the sill and spaced from the pillar. The assembly may include a second link rotatably connected to the second pillar and rotatably coupled to the second member. The link and the second link may be recessed relative to the door opening in the undeployed position and may be across the door opening in the deployed position. The assembly may include a second pyrotechnic actuator supported by the vehicle body and connected to the second member. The assembly may include a linkage including the link and another link extending from the link to the member. The assembly may include a second linkage including the second link and another link extending from the second link to the second member. One of the member and the second member may include a tongue and the other of the member and the second member may include a groove spaced from the tongue in the undeployed position and receiving the tongue in the deployed position.

The assembly may include a linkage including the link and another link extending from the link to the member.

The assembly may include a spring-loaded lock operable to lock the member relative to the sill in the deployed position.

The assembly may include a pin abutting the member and a spring biases the pin toward the member in the undeployed position.

The assembly may include a base supported by the vehicle body. The member may be rotatably connected to the base. The base may include a bottom and a plurality of walls extending upward from the bottom defining a cavity housing the in the undeployed position. The base may include a ledge and the member may include a brace spaced from the ledge in the undeployed position and abutting the ledge in the deployed position. The member may include a body rotatably engaged with the base and the brace is vehicle-inboard of the body. The assembly may include a pin rotatably connecting the member to the base.

With reference to the Figures, wherein like numerals indicate like parts throughout the several views, an assembly 10 for a vehicle 12 includes a vehicle body 14 including a sill 16 and a pillar 18 extending upwardly from the sill 16 defining a door opening 20. A member 22 is rotatably supported by the sill 16 and is rotatable relative to the sill 16 from an undeployed position to a deployed position. A link 30 is rotatably supported by the pillar 18 and the member 22. A pyrotechnic actuator 26 is supported by the vehicle body 14 and is connected to the member 22.

As the member 22 rotates from the undeployed position to the deployed position, the member 22 and the link 30 are across the door opening 20 to reinforce the vehicle body 14 at the door opening 20. The member 22 and the link 30 in the deployed position may limit intrusion into the vehicle 12 during a vehicle impact, e.g., a vehicle-side impact. Specifically, since the link 30 is rotatably supported by the pillar 18 and the member 22, the link 30 extends across the door opening 20 to connect the pillar 18 to the member 22 in the deployed position. Forces on the link 30 during vehicle impact are transmitted to the pillar 18 and/or the member 22. Accordingly, the link 30 provides resistance to intrusion in the area between the pillar 18 and the member 22. As one example, the vehicle 12 shown in the example in the figures does not include a middle pillar, i.e., is B-pillarless, and, in such an example, the member 22 and the link 30 in the deployed position are across the door opening 20 to reinforce the area traditionally occupied by a middle pillar to reduce the likelihood of intrusion during a vehicle impact.

In some examples, including the example shown in the figures, the assembly 10 may include a linkage 28 including the link 30 and at least another link 30 extending from the member 22 to the pillar 18. In such an example, movement of the member 22 to the deployed position deploys the linkage 28 across the door opening 20 from the member 22 to the pillar 18.

In some examples, including the example shown in the figures, the assembly 10 includes two member (e.g., a first member 22 and a second member 32) and two links 30 (e.g., a first link 24 and a second link 68). Specifically, the assembly 10 may include two members 22,32 and two linkages 28,34 (e.g., a first linkage 28 and a second linkage 34) with each linkage 28 including links 30. The vehicle body 14 includes a second pillar 36 extending upwardly from the sill 16 defining the door opening 20 between the pillar 18 (referred to as the "first pillar 18") and the second pillar 36. In such an example, the second link 68 is rotatably supported by the second pillar 36 and the second member 32. The second member 32 is rotatable relative to the sill 16 from an undeployed position to a deployed position. In such an example, the first member 22 and the second member 32 are across the door opening 20 in the deployed position. In the deployed position, the first link 24 extends across the door opening 20 to connect the first pillar 18 and the first member 22 and the second link 68 extends across the door opening 20 to connect the second pillar 36 and the second member 32. Accordingly, the first link 24 provides resistance to intrusion in the area between the first pillar 18 and the first member 22 and the second link 68 provides resistance to intrusion in the area between the second pillar 36 and the second member 32. In such an example, the first member 22 and the second member 32 may abut each other in the deployed position and the first linkage 28 extends from the first member 22 to the first pillar 18 and a second linkage 34 extends from the second member 32 to the second pillar 36. In such an example, the first linkage 28, the first member 22, the second member 32, and the second linkage 34 extend continuously from the first pillar 18 to the second pillar 36 to resist intrusion between the first pillar 18 and the second pillar 36. As one example, the vehicle 12 shown in the example in the figures does not include a middle pillar, i.e., is B-pillarless, and, in such an example, the first linkage 28, the first member 22, the second member 32, and the second linkage 34 in the deployed position are across the door opening 20 and engage each other to reinforce the area traditionally occupied by a middle pillar to reduce the likelihood of intrusion during a vehicle impact.

As set forth further below, a reinforcement assembly 38 includes the member 22, i.e., the first member 22, and the link 30, i.e., the first link 24. In the example shown in the figures, the reinforcement assembly 38 includes the first member 22, the first linkage 28, the second member 32, and the second linkage 34. The reinforcement assembly 38 may, for example, include a base 40 with the first member 22 and the second member 32 rotatably mounted to the base 40, as described further below. The reinforcement assembly 38, e.g., the base 40, is mounted to the vehicle body 14. The reinforcement assembly 38 may include the pyrotechnic actuator 26, e.g., the first pyrotechnic actuator 26 and a second pyrotechnic actuator 42, that moves the first member 22 and the second member 32 from the undeployed position to the deployed position.

With reference to the figures, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from the driver, i.e., the vehicle 12 may be self-driving without human input.

As shown in FIG. 1, the vehicle 12 includes a vehicle frame (not numbered) and the vehicle body 14. The vehicle frame and the vehicle body 14 may be of a unibody construction in which the vehicle frame is unitary with the vehicle body 14 (including door openings 20, frame rails, pillars 18,36, roof 46 rails, rocker 44 s, etc.). As another example, the vehicle body 14 and vehicle frame may have a body-on-frame construction (also referred to as a cab-on-frame construction) in which the vehicle body 14 and vehicle frame are separate components, i.e., are modular, and the vehicle body 14 is supported on and affixed to the vehicle frame. Alternatively, the vehicle frame and vehicle body 14 may have any suitable construction. The vehicle frame and vehicle body 14 (e.g., door openings 20, frame rails (not numbered), pillars 18,36, roof 46 rails (not numbered), rockers 44 (not numbered), etc.) may be of any suitable material, for example, steel, aluminum, and/or fiber-reinforced plastic, etc.

The vehicle body 14 may define a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

Figure 2:
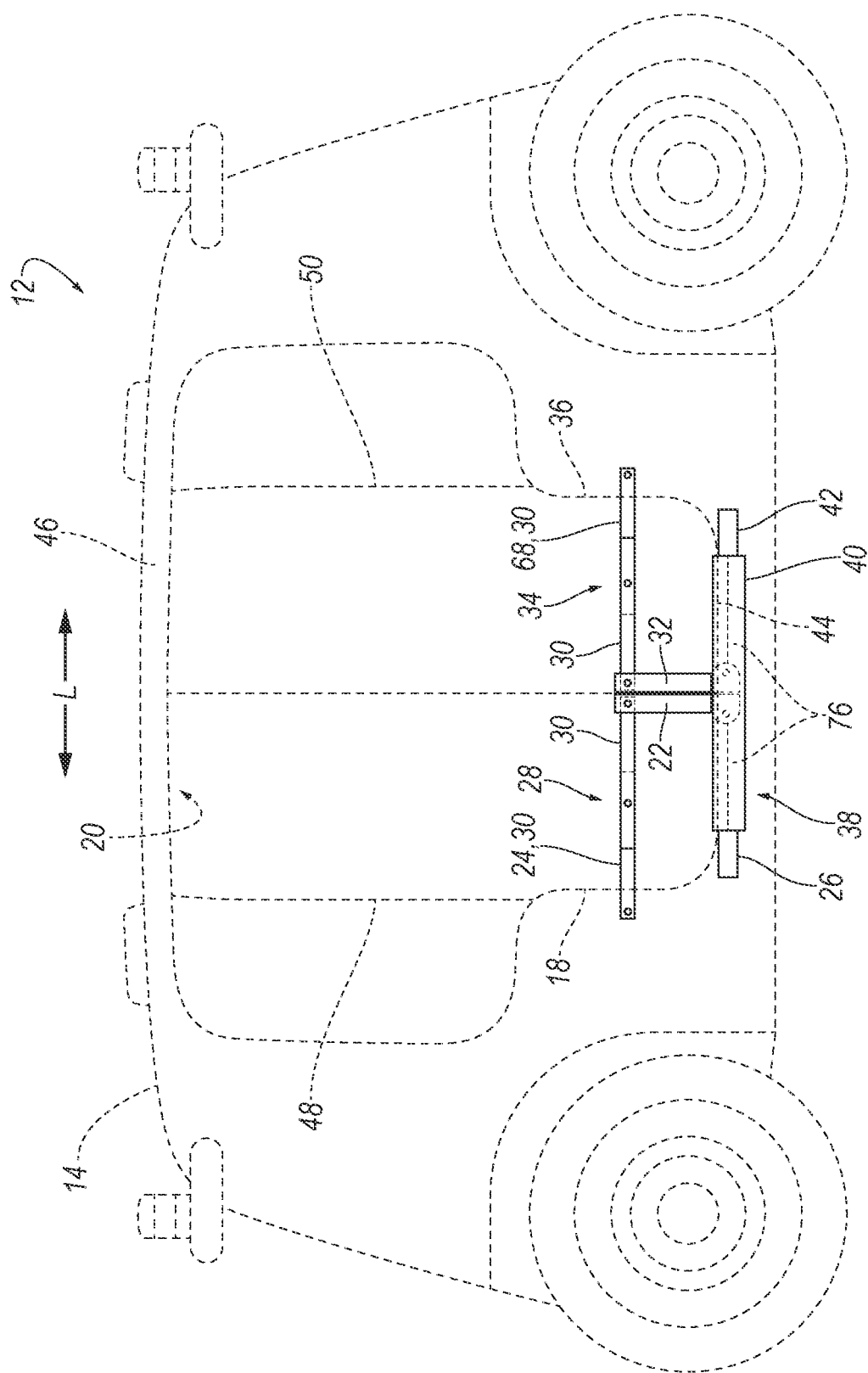
FIG. 2 is a perspective view of the vehicle with the reinforcement assembly in a deployed position.
Figure 3A:
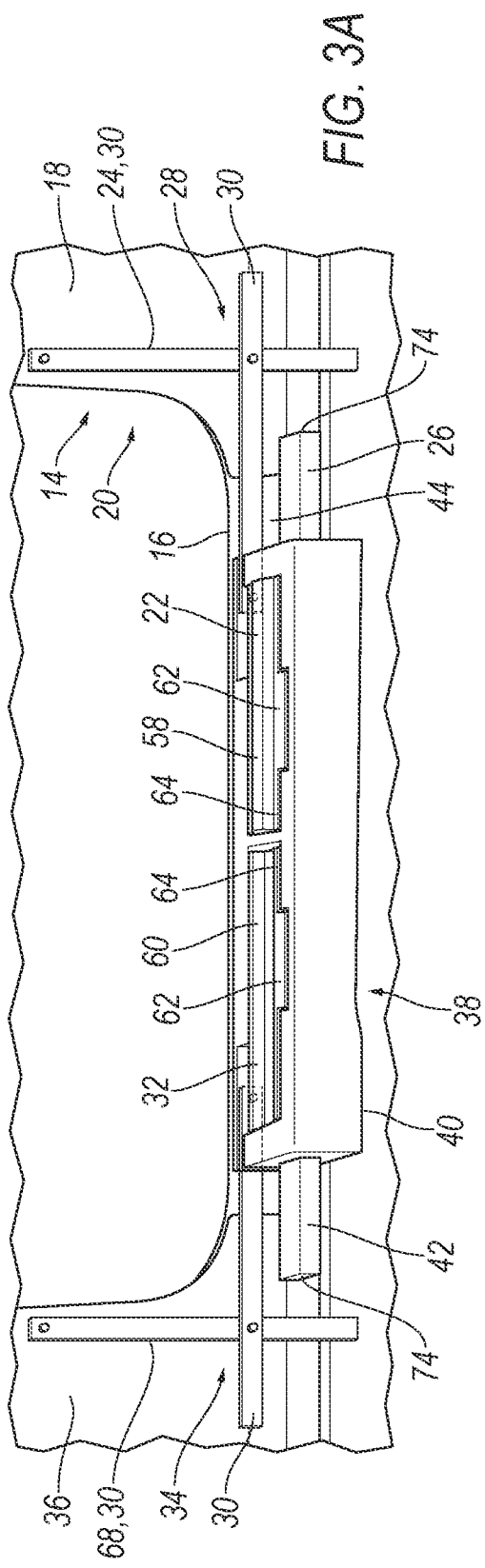
FIG. 3A is a perspective view of the vehicle with the reinforcement assembly in a deployed position.
Figure 3B:
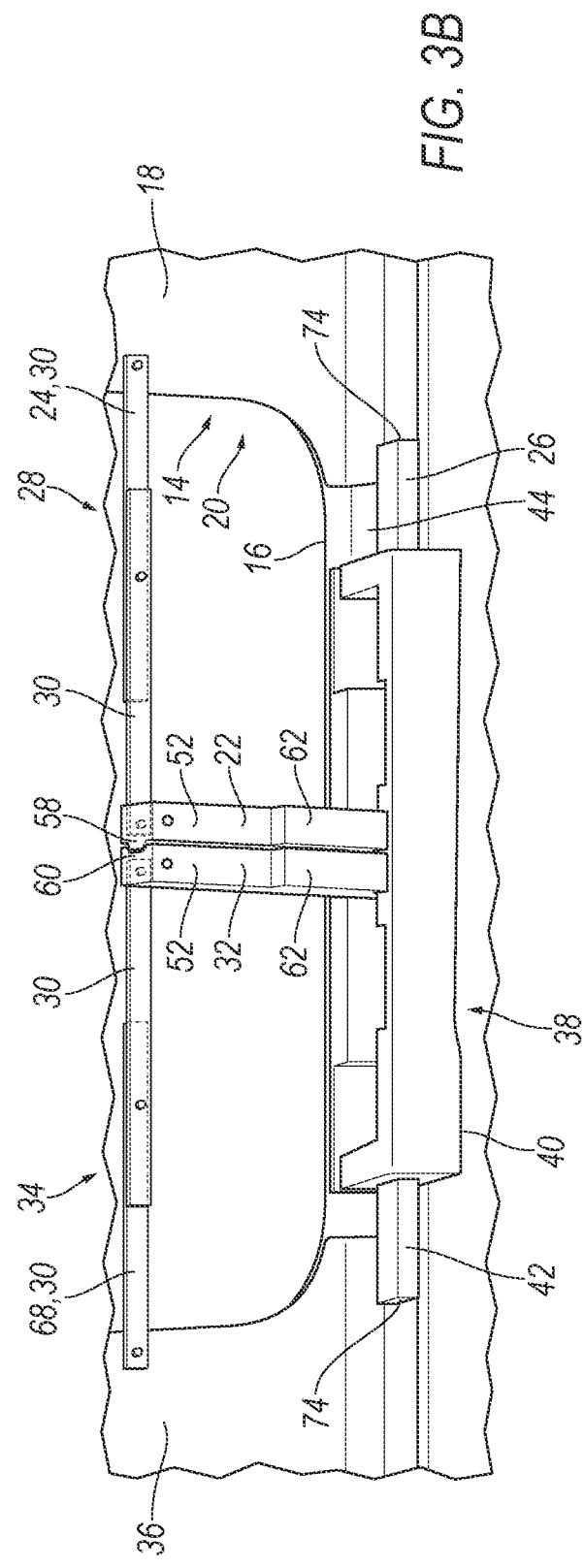
FIG. 3B is a perspective view of a portion of the vehicle including the reinforcement assembly in the deployed position.
Figure 4:
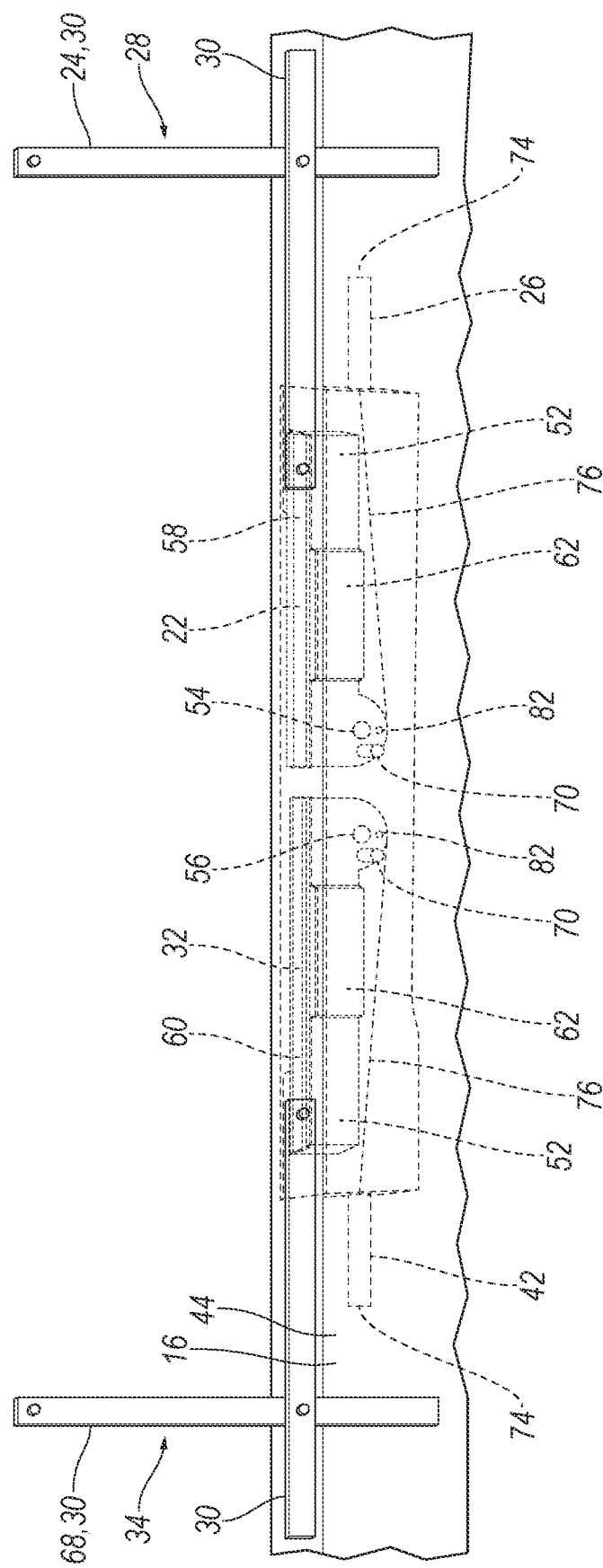
FIG. 4 is a perspective view of a portion of the vehicle including the reinforcement assembly in the undeployed position.
Figure 5:
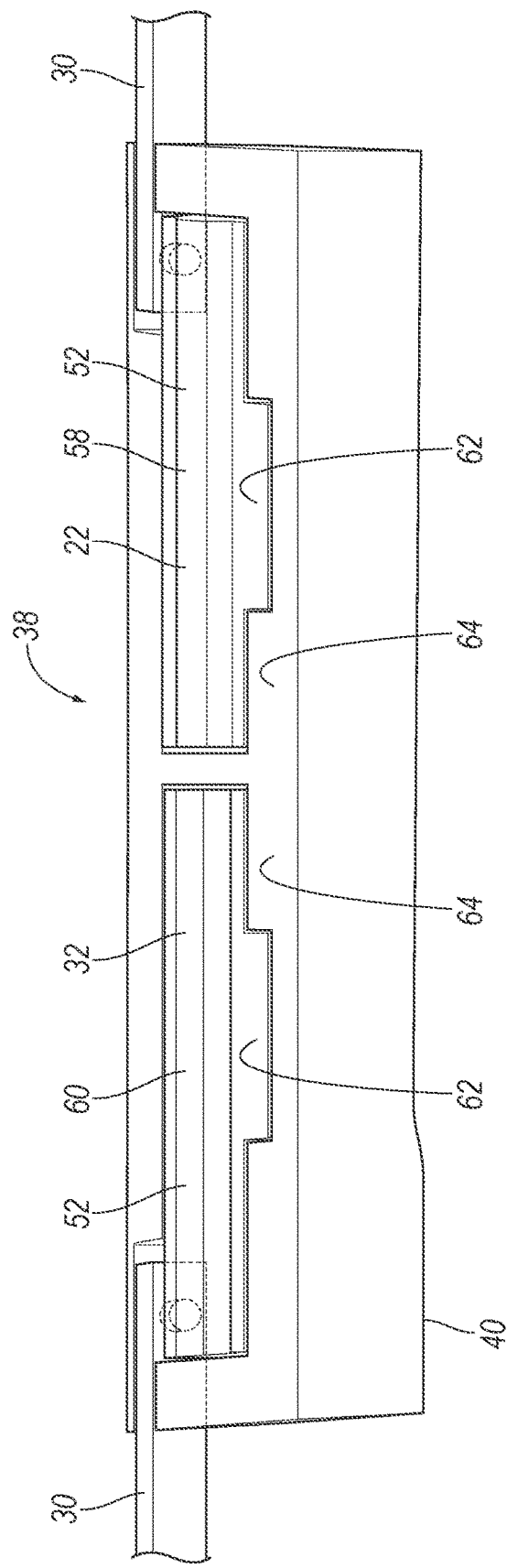
FIG. 5 is a perspective view of the reinforcement assembly in the undeployed position.
Figure 6:
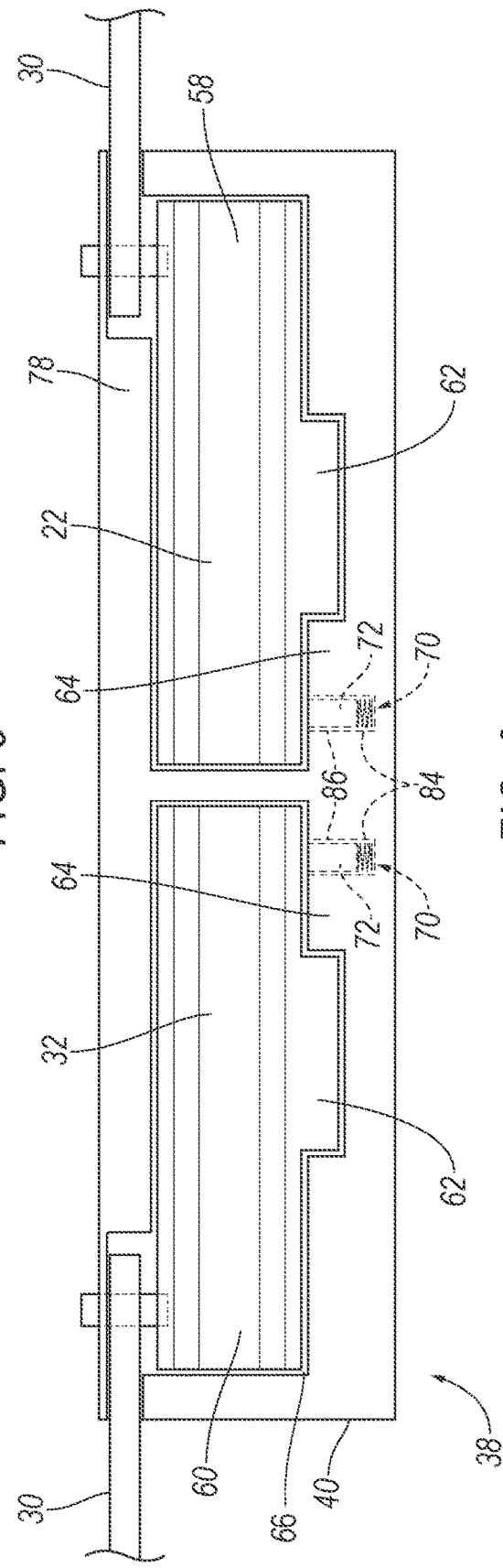
FIG. 6 is a top-down view of the reinforcement assembly in the deployed position with the FIG. 7 is a perspective view of the reinforcement assembly in the deployed position with a first member and second member of the reinforcement assembly rotated relative to a base of the reinforcement assembly.
Figure 7:
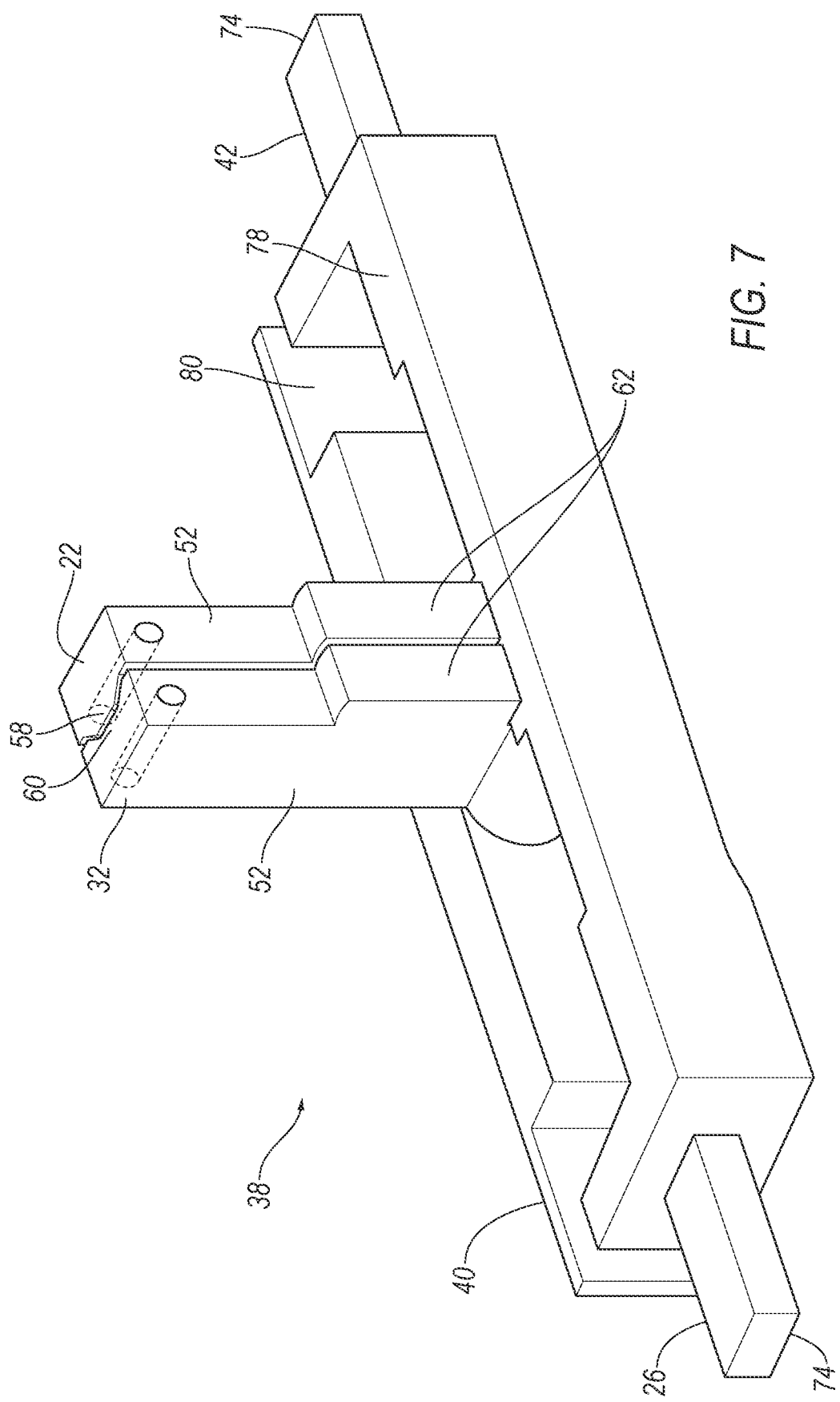
Figure 8:
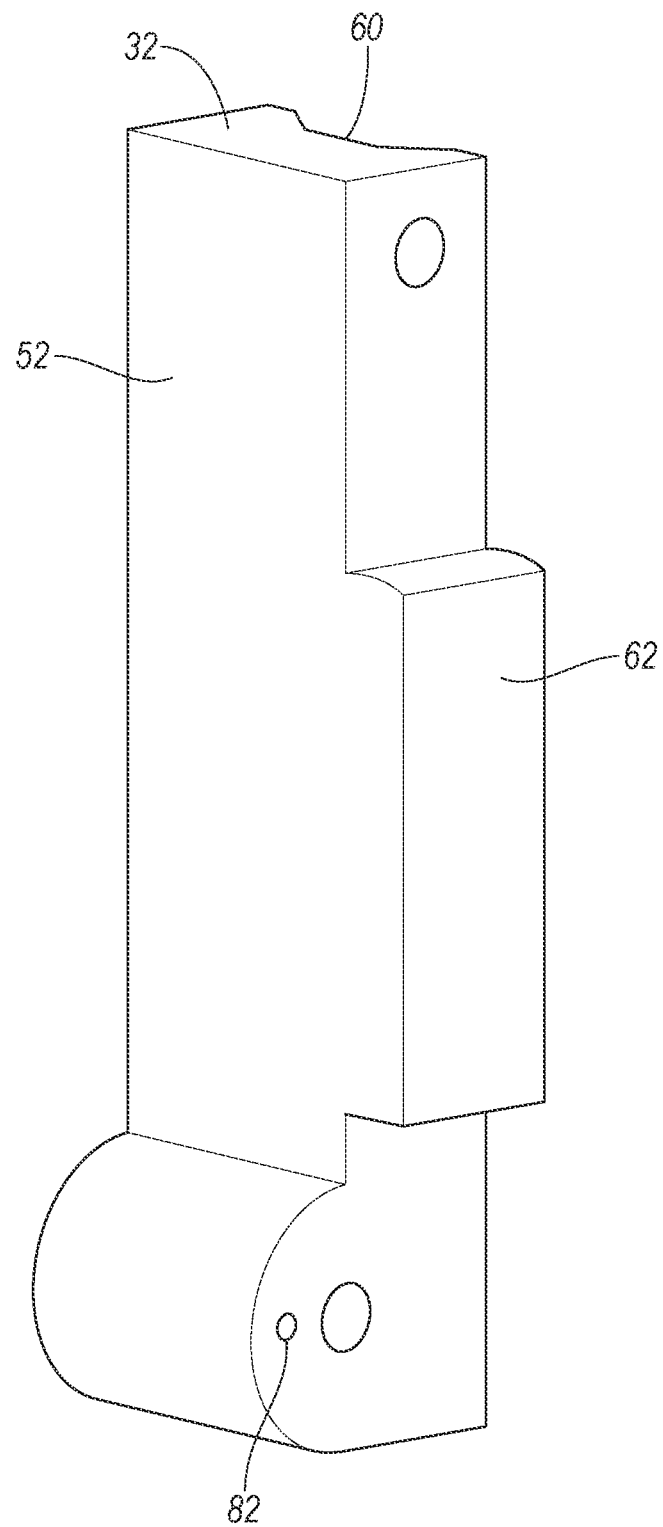
FIG. 8 is a perspective view of one of the members of the reinforcement assembly.

The vehicle body 14 includes a floor (FIGS. 3A-B) and may include a roof 46 (FIGS. 1-2). The roof 46 may define the upper boundary of the passenger compartment and may extend from the front end of the passenger compartment to the rear end of the passenger compartment. The floor is below from the roof 46. The floor may define the lower boundary of the passenger compartment and may extend from the front end of the passenger compartment to the rear end of the passenger compartment.

With reference to FIGS. 1-3B, the vehicle body 14 includes pillars 18,36, spaced from each along a vehicle-longitudinal axis L. Specifically, the vehicle body 14 includes the first pillar 18 and the second pillar 36. The second pillar 36 may be spaced vehicle-rearward of the first pillar 18, i.e., the first pillar 18 may be referred to as an A-pillar 18 and the second pillar 36 may be referred to as a C-pillar 36 even in examples in which there is no B-pillar. The vehicle body 14 includes pillars 18,36, on each side of the vehicle 12, i.e., the vehicle body 14 includes one first pillar 18 and one second pillar 36 on each side of the vehicle 12. The first pillar 18 may be disposed at the front end of the passenger compartment and the second pillar 36 may be disposed at the rear end of the passenger compartment. The pillars 18,36 may extend from the sill 16 to the roof 46. The vehicle 12 may include other pillars 18,36 in addition to the first pillar 18 and second pillar 36.

With continued reference to FIGS. 1-3B, the vehicle body 14 may not include a middle pillar between the first pillar 18 and the second pillar 36, i.e., the vehicle body 14 may not include a middle pillar between the first pillar 18 and the second pillar 36 that extends from the floor to the roof 46. In other words, the vehicle body 14 in FIG. 1 is B-pillarless. The vehicle body 14 lacking a middle pillar allows for the door opening 20 to extend from the first pillar 18 to the second pillar 36. The door opening 20 extending from the first pillar 18 to the second pillar 36 allows easier occupant ingress and egress to the passenger compartment.

The vehicle body 14 may include a rocker 44 extending from the first pillar 18 to the second pillar 36. Specifically, the vehicle body 14 may include two rockers 44, one on each side of the vehicle body 14. The rockers 44 are elongated along the vehicle-longitudinal axis L. The rockers 44 may be adjacent the floor. The roof 46, rockers 44, floor, and pillars 18,36 may be irremovably fixed to each other, i.e., unable to be removed without cutting or other destruction of the roof 46 panel and/or roof 46. In some examples, the pillars 18,36 may be unitary with the rockers 44 and/or the roof 46, i.e., a single, uniform piece of material with no seams, joints, fasteners, or adhesives connecting the pillars 18,36, to the rockers 44 and/or the roof 46. In such an example, the pillars 18,36, and rockers 44 and/or roof 46 may be formed together simultaneously as a single continuous unit, e.g., by stamping, molding, etc. In other examples, in the alternative to being unitary, the pillars 18,36, may be formed separately from the rockers 44 and/or roof 46 and subsequently connected to the rockers 44 and/or roof 46, e.g., by welding.

As set forth above, the vehicle body 14 includes the sill 16. The sill 16 defines the lower-most boundary of the door opening 20. The sill 16 may be an uppermost surface of the rocker 44. As another example, the sill 16 may be separate from the rocker 44 and disposed above the rocker 44.

With reference to Figures, as set forth above, the vehicle body 14 includes the door opening 20. The door opening 20 may be between the first pillar 18 and the second pillar 36 and between the sill 16, e.g., the rocker 44, and the roof 46. Specifically, the door opening 20 may extend from the first pillar 18 to the second pillar 36 and from the sill 16, e.g., from the rocker 44, to the roof 46. In other words, the pillars 18,36, are spaced from each other by the door opening 20 and the roof 46 and sill 16 are spaced from each other by the door opening 20. The door opening 20 extends uninterrupted from the first pillar 18 to the second pillar 36. The door opening 20 extends uninterrupted from the sill 16, e.g., the rocker 44, to the roof 46 rails. The door opening 20 allows for ingress into and egress from the passenger compartment. The vehicle 12 may include any suitable number of door openings 20 to allow for occupant ingress and egress. For example, the vehicle 12 may include one door opening 20 on each side of the vehicle 12. In other examples, the vehicle 12 may include multiple door openings 20 on each side of the vehicle 12.

With reference to FIGS. 1-2, the vehicle 12 may include a plurality of doors 48,50, e.g., one or more doors 48,50 on any side of the vehicle body 14. As an example, the vehicle 12 may include the first door 48 supported by the first pillar 18 and the second door 50 supported by the second pillar 36. The first door 48 and the second door 50 may be moveably mounted to the vehicle body 14, e.g., the first pillar 18 and the second pillar 36, respectively. For example, the first door 48 and the second door 50 may be slideably mounted (as shown in FIGS. 1-2), hingedly mounted, etc., to the vehicle body 14.

As shown in FIGS. 2 and 3, the first door 48 and the second door 50 are moveable relative to each other between an open positioned (not shown) and a closed position (shown in FIGS. 1 and 2). In the closed position, the doors 48,50 are in at least one of the door openings 20 in the vehicle body 14. In the example shown in the figures, the first door 48 and the second door 50 are both in the single one of door openings 20. The doors 48,50 may abut each other and may abut the pillars 18,36, the rocker 44, e.g., the sill 16, and the roof 46 in the closed position. In the open position, the door opening 20 is exposed for occupant ingress and egress. When the doors 48,50 are in the closed position, the reinforcement assembly 38 is inboard of the doors 48,50, as described further below.

The doors 48,50 may be slidable between the open position and the closed position. For example, the vehicle body 14 may include a track (not shown with the doors 48,50 being slidably supported by the track. In such examples, the doors 48,50 are slidable between the closed position to the open position. In the closed position, the first door 48 and the second door 50 are adjacent each other, e.g., may abut each other. As the doors 48,50 move to the open position, the first door 48 moves away from the second door 50 and toward the front end of the passenger compartment and the second door 50 moves away from the first door 48 toward the rear end of the passenger compartment. In other examples, the first door 48 and/or the second door 50 may be rotatably mounted, e.g., hinged, to the first pillar 18 and second pillar 36, respectively. In such an example, the doors 48,50 rotate between the closed position and the open position.

The doors 48,50 may include at least one door panel (not numbered) and a door-trim panel (not numbered) supported on the door panel. Specifically, the doors 48,50 may include two panels, namely a door inner (not numbered) and a door outer (not numbered). In such an example, the door-trim panel and the door outer are fixed to the door inner. The door-trim panel is positioned opposite the door outer relative to the door frame. The door-trim panel is inboard relative to the door inner, and the door outer is outboard relative to the door inner. The door outer faces outboard relative to the vehicle 12. The door outer may define a portion of the exterior of the vehicle 12. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

As set forth above, the reinforcement assembly 38 includes the first member 22 and the first linkage 28 and may include the second member 32 and the second linkage 34. The reinforcement assembly 38 may include the base 40, the first pyrotechnic actuator 26, and the second pyrotechnic actuator 42. In an example including the base 40, the first member 22, and the second member 32, the base 40 may be fixed to the vehicle body 14 and the first member 22 and second member 32 are rotatably connected to the base 40. The reinforcement assembly 38 is moveable from the undeployed position (FIG. 1) to the deployed position (FIG. 2). Specifically, the first member 22 and the first linkage 28 and the second member 32 and the second linkage 34 rotate from the undeployed position to the deployed position.

As set forth above, the first member 22 and the second member 32 are each supported by the vehicle body 14. Specifically, the weight of the first member 22 and the second member 32 are borne directly or indirectly by the vehicle body 14. For example, in the example shown in the figures, the reinforcement assembly 38 may include the base 40 and in such an example, the base 40 is supported by the vehicle body 14, and the first member 22 and second member 32 are supported by the vehicle body 14. In such an example, the base 40 may be directly connected to the vehicle body 14 and the first member 22 and second member 32 may be directly connected to the base 40, as described below.

The first member 22 and the second member 32 are connected to the base 40. For example, the first member 22 and the second member 32 may each include a body 52 and the body 52 may be connected to the base 40. As set forth above, the first member 22 and the second member 32 may be directly connected to the base 40. For example, pins 54,56 may rotatably connect the first member 22 and the second member 32 to the base 40 (e.g., a first pin 54 connects the first member 22 to the base 40 and a second pin 56 connects the second member 32 to the base 40). Specifically, for example, as set forth above, first member 22 and the second member 32 may each define a hole (not numbered) and the pins 54,56 extend through the holes, respectively, and engage the base 40. In such an example, the first member 22 and the second member 32 are rotatably connected to the base 40.

As set forth above, the first member 22 and the second member 32 are rotatable from the undeployed position to the deployed position. Specifically, the first member 22 and the second member 32 are both rotatable relative to each other and relative to the vehicle body 14 from the undeployed position to the deployed position. In the undeployed position, the first member 22 and the second member 32 may be lowered, e.g., entirely, or partly recessed relative to the vehicle body 14, door opening 20, etc., in the undeployed position. Specifically, in the undeployed position, the first member 22 and the second member 32 are positioned to avoid interference with occupant ingress and egress to the passenger compartment. In the undeployed position, the first member 22 and the second member 32 are below, i.e., vertically lower than, the door opening 20 and/or the doors 48,50 when the doors 48,50 are in the door opening 20. In the example shown in the figures, the first member 22 and the second member 32 are inboard of the doors 48,50 and the door opening 20 in the undeployed position.

As set forth above, the first member 22 and the second member 32 are across the door opening 20 in the deployed position. In other words, the first member 22 and the second member 32 extend from the vehicle body 14 into or adjacent to the door opening 20 in the deployed position. Specifically, at least a portion of the first member 22 and the second member 32 are vertically above the sill 16 either in the door opening 20 or adjacent the door opening 20 in the deployed position. In the example shown in the figures, the first member 22 and the second member 32 are inboard of the door opening 20 adjacent the door opening 20, i.e., with nothing between the first member 22 and second member 32 and the doors 48,50 and door opening 20. The first member 22 and the second member 32 are upright in the deployed position. As an example, the first member 22 and the second member 32 may be vertical in the deployed position.

As set forth above, the first member 22 and the second member 32 may be inboard of the doors 48,50 in the deployed position. In other words, with the doors 48,50 in the closed position, the first member 22 and the second member 32 may be inboard of the innermost surface of the door adjacent the first member 22 and the second member 32, e.g., the surface of the door-trim panel. As set forth below, the first member 22 and the second member 32 may be rotated to the deployed position in response to a detected vehicle impact to resist intrusion.

The first member 22 and second member 32 are between the first pillar 18 and the second pillar 36 along the vehicle longitudinal axis L of the vehicle 12 in the undeployed position and the deployed position. As an example, the first member 22 and the second member 32 may be at the joint of the first door 48 and the second door 50 when the first door 48 and the second door 50 are in the closed position and the first member 22 and second member 32 are in the deployed position. In such an example, the first member 22 and the second member 32 in the deployed position may be in a middle third of the door opening 20 along the vehicle longitudinal axis L of the vehicle 12.

In the deployed position, the first member 22 and the second member 32 are elongated upwardly across the door opening 20, e.g., elongated from the rocker 44 upwardly across the door opening 20. As an example, the first member 22 and the second member 32 may be elongated substantially vertically. The first member 22 and the second member 32 may extend upwardly, e.g., from the sill 16, 8-24 inches.

The first member 22 and the second member 32 may be of a rigid type of material and construction to resist intrusion during a side impact. As described further below, the first member 22 and the second member 32 may include a tongue 58 and groove 60, respectively. The first member 22 and the second member 32 may be rectangular in cross section, as shown in the example in the figures. The first member 22 and the second member 32 may be, for example, metal (such as steel, aluminum, etc.), plastic (such as fiber-reinforced plastic), etc.

As set forth above, in the deployed position, the first member 22 and the second member 32 may engage each other. For example, the first member 22 and the second member 32 may interlock with each other. As an example, one of the first member 22 and the second member 32 includes a tongue 58 and the other of the first member 22 and second member 32 includes a groove 60. In the undeployed position, the tongue 58 is disengaged with the groove 60, e.g., spaced from the groove 60, and in the engaged position the tongue 58 is engaged in the groove 60, e.g., abutting the groove 60. In such an example, the tongue 58 and the groove 60 are designed, i.e., sized, shaped, and positioned, to engage each other when the first member 22 and the second member 32 are in the deployed position. Specifically, the tongue 58 extends from the body 52 along vehicle longitudinal axis L of the vehicle 12 and the groove 60 extends into the body 52 along the vehicle longitudinal axis L of the vehicle 12. Accordingly, the tongue 58 and the groove 60 engage each other along the vehicle longitudinal axis L in the deployed position. In the example shown in the figures, merely by way of example, the first member 22 includes the tongue 58 and the second member 32 includes the groove 60. Since the first member 22 and the second member 32 engage each other in the deployed position, the first member 22 and the second member 32 reinforce each other to increase the overall structural rigidity of the first member 22 and the second member 32 in the deployed position to resist intrusion. Since the first member 22 and the second member 32 engage each other in the deployed position, the first member 22 and the second member 32 reinforce each other to increase the overall structural rigidity of the first member 22 and the second member 32 in the deployed position to resist intrusion. Specifically, the first member 22 and the second member 32 engage each other, e.g., the tongue 58 and groove 60 engage each other, in a plane transverse to a vehicle-side impact to resist intrusion during the vehicle-side impact. As one example, the vehicle 12 shown in the example in the figures does not include a middle pillar, i.e., is B-pillarless, and, in such an example, the first member 22 and the second member 32 in the deployed position are across the door opening 20 and engage each other to reinforce the area traditionally occupied by a middle pillar to reduce the likelihood of intrusion during a vehicle impact.

The first member 22 and/or the second member 32 may include a brace 62 to resist door intrusion. Specifically, the brace 62 extends from the body 52 vehicle-inboard. When the first member 22 and the second member 32 are deployed, the brace 62 is inboard of the body 52. During a vehicle-side impact, forces from the vehicle-side impact may push the body 52 toward the brace 62 and the brace 62 resists inward intrusion of the body 52. During a vehicle-side impact, the brace 62 abuts another component of the vehicle 12 to resist door intrusion. For example, as shown in the figures, the brace 62 abuts the base 40. Specifically, in the example shown in the figures, the base 40 includes a ledge 64 and the brace 62 abuts the ledge 64 in the deployed position. In such an example, the brace 62 is spaced from the ledge 64 in the undeployed position and abuts the ledge 64 in the deployed position. In the example shown in the figures, both the first member 22 and the second member 32 include the brace 62.

As set forth above, the reinforcement assembly 38 may include the base 40 that houses the first member 22 and the second member 32. The base 40 may be supported by the vehicle body 14 and the first member 22 and second member 32 may be supported by the base 40, i.e., the weight of the base 40 may be borne by the vehicle body 14 and the weight of the first member 22 and second member 32 may be borne by the base 40. The base 40 may be, for example, fixed to the vehicle body 14, e.g., with fasteners, welding, etc.

The base 40 includes a bottom 66 and walls 78 extending upward from the bottom 66 defining one or more cavities 80 housing the first member 22 and the second member 32 in the undeployed position. The walls 78 are configured to, i.e., sized, shaped, and positioned, to house the first member 22 and the second member 32 in the undeployed position. The first member 22 and the second member 32 may be completely recessed relative to the walls 78 in the undeployed position, as shown in the example show in the figures. As set forth above, the base 40 may be directly connected to the vehicle body 14. For example, the bottom 66 and/or walls 78 of the base 40 may abut the vehicle body 14 and may be welded, fastened, etc., to the vehicle body 14.

As set forth above, the first link 24 is supported by the first pillar 18 and the first member 22. Specifically, the weight of the first link 24 is borne by the first pillar 18 and the first member 22. When the first member 22 moves from the undeployed position to the deployed position, the first member 22 moves across the door opening 20 and moves the first link 24 across the door opening 20. As set forth above, forces on the first link 24 during vehicle impact are transmitted to the first pillar 18 and/or the first member 22. Accordingly, the first link 24 provides resistance to intrusion in the area between the first pillar 18 and the first member 22. As one example, the vehicle 12 shown in the example in the figures does not include a middle pillar, i.e., is B-pillarless, and, in such an example, the first member 22 and the first link 24 in the deployed position are across the door opening 20 to reinforce the area traditionally occupied by a middle pillar to reduce the likelihood of intrusion during a vehicle impact. In examples including the second link 68, the second link 68 is supported by the second pillar 36 and supported by the second member 32 and operates similarly to the first link 24 described above.

As set forth above, the reinforcement assembly 38 may include the first linkage 28 including the first link 24. In such an example, the first linkage 28, i.e., the first link 24 and other links 30 of the first linkage 28, provides resistance to intrusion as described above. In some examples, including the example shown in the figures, the reinforcement assembly 38 may include the second linkage 34 including the second link 68. The first linkage 28 is supported by the first pillar 18 and the first member 22 and the second linkage 34 is supported by the second pillar 36 and the second member 32. Specifically, the first linkage 28 is rotatably connected to the first pillar 18 and the first member 22. In examples including the second linkage 34, the second linkage 34 is rotatably connected to the second pillar 36 and the second member 32. As the first member 22 moves from the undeployed position to the deployed position, the first member 22 moves the first linkage 28 across the door opening 20. In examples including the second linkage 34, as second member 32 moves from the undeployed position to the deployed position, the second member 32 moves the second linkage 34 across the door opening 20.

In the deployed position, the first linkage 28 extends across the door opening 20 from the first member 22 to the first pillar 18 and, in examples including the second linkage 34, the second linkage 34 extends across the door opening 20 from the second member 32 to the second pillar 36. In such an example, the first linkage 28, the first member 22, the second member 32, and the second linkage 34 extend continuously from the first pillar 18 to the second pillar 36 to resist intrusion between the first pillar 18 and the second pillar 36. As one example, the vehicle 12 shown in the example in the figures does not include a middle pillar, i.e., is B-pillarless, and, in such an example, the first linkage 28, the first member 22, the second member 32, and the second linkage 34 in the deployed position are across the door opening 20 and engage each other to reinforce the area traditionally occupied by a middle pillar to reduce the likelihood of intrusion during a vehicle impact. In some examples, as described above, the first member 22 and the second member 32 may engage each other such that the linkage 28, the first member 22, the second member 32, and the second linkage 34, in combination, extend across the door opening 20 from the first pillar 18 to the second pillar 36 above the sill 16. The first linkage 28 and the second linkage 34 in an undeployed position are recessed relative to the door opening 20.

The first linkage 28 and second linkage 34 may each include a plurality of links 30. In the example shown in the figures, the first linkage 28 and the second linkage 34 each include two links 30. Specifically, the first linkage 28 includes the first link 24 connected to the first pillar 18 and another link 30 extending from the first link 24 to the first member 22, and the second linkage 34 includes the second link 68 connected to the second pillar 36 and another link 30 extending from the second link 68 to the second member 32. The first link 24 and second link 68 are recessed relative to the door opening 20 in the undeployed position and are across the door opening 20 in the deployed position. In other examples, reinforcement assembly 38 may include one link 30, i.e., the first link 24, from the first pillar 18 to the first member 22 or the reinforcement may include more than two links 30 connecting the first pillar 18 to the first member 22. In examples in which the first linkage 28 and/or the second linkage 34 include more than one link 30, the links 30 may be rotatably connected to each other and the respective pillar 18, 36 and member 22, 32 with connections, for example, pins 54,56, or in any other suitable way. The links 30 may be metal or any other suitable type of material.

In examples including the linkage 28 including the plurality of links 30, the links 30 may be reinforced at the connection with each other and/or the respective pillar 18 and member 22. As an example, as shown in the figures, the link 30 may include an extension elongated from the connection. In the deployed position, the extension overlaps the adjacent component (i.e., link 30, pillar 18, member 22) to reinforce the linkage 28 at the connection, e.g., to resist twisting. As another example, the link 30 may include a C-shaped end that receives the adjacent component to resist twisting at the connection.

The reinforcement assembly 38 may include one or more spring-loaded locks 70 operable to lock the first member 22 and the second member 32 relative to the sill 16 in the deployed position. Specifically, the spring-loaded lock 70 may be between the base 40 and the first member 22 and/or second member 32 to lock the first member 22 and/or second member 32 relative to the base 40 to lock the first and/or second member 32 relative to the base 40 in the deployed position. In the example shown in the figures, the reinforcement assembly 38 includes one of the spring-loaded locks 70 between the base 40 and the first member 22 and another of the spring-loaded locks 70 between the base 40 and the second member 32. The spring-loaded locks 70 lock the first member 22 and the second member 32, respectively, relative to the base 40 and relative to each other.

The spring-loaded lock 70 may include a pin 72 abutting the first/second member 32, and a spring 84 biasing the pin 72 toward the first/second member 32 in the undeployed position. Specifically, the spring-loaded lock 70 may be housed by the base 40. With reference to Figure, in the example shown in the figures, the base 40 includes a pocket 86 housing the pin 72 and the spring 84. The first/second member 32 includes a hole 82 that is aligned with and receive the pin 72 when the first/second member 32 is in the deployed position and the spring 84 pushes the pin 72 into the hole 82. With the pin 72 in the hole 82, the first/second member 32, is locked relative to the base 40 to remain in the deployed position.

As set forth above, the reinforcement assembly 38 may include one or more pyrotechnic actuators 26. In the example shown in the figures, the reinforcement assembly 38 includes a first pyrotechnic actuator 26 and a second pyrotechnic actuator 42. The first pyrotechnic actuator 26 is connected to the first member 22 and the second pyrotechnic actuator 42 is connected to the second member 32. Specifically, the first pyrotechnic actuator 26 may be operatively connected to the first member 22 to move the first member 22 to the deployed position and the second pyrotechnic actuator 42 may be operative connected to the second member 32 to move the second member 32 to the deployed position. In the example shown in the figures, the pyrotechnic actuator 26 includes a cylinder 74 and a cable 76 engaged with the cylinder 74 and connected to the first/second member 32, at a connection point spaced from the pin 54,56. The pyrotechnic actuator 26 is actuated to retract the cable 76 into the cylinder 74 and pull the first/second member 22,32 to rotate the body 52 of the first/second member 22,32 about the pin 54,56 from the undeployed position to the deployed position.

The pyrotechnic actuator 26 is supported by the vehicle body 14. Specifically, the pyrotechnic actuator 26 may be fixed to the base 40 or the vehicle body 14 and in any event the weight of the pyrotechnic actuator 26 is borne directly or indirectly by the vehicle body 14. The pyrotechnic actuator 26 includes a pyrotechnic charge. The pyrotechnic charge is activated to activate the pyrotechnic actuator 26 and retract the cable 76 into the cylinder 74. The pyrotechnic actuator 26 may be, for example, a rotary actuator or a linear actuator. The pyrotechnic actuator 26 may be a component of the reinforcement assembly 38. In such an example the pyrotechnic actuator 26 may be fixed to and/or supported by the base 40.

The vehicle 12 includes a computer that controls the pyrotechnic actuator 26. The computer may be, for example, a restraints control module. The vehicle computer includes a processor and a memory. The memory includes one or more forms of computer readable media, and stores instructions executable by the vehicle computer for performing various operations, including as disclosed herein. For example, a vehicle computer can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, a vehicle computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the computer, and the computer can retrieve information stored by the memory via a network in the vehicle 12, e.g., over a CAN bus, a wireless network, etc. Alternatively or additionally, the memory can be part of the computer, e.g., as a memory of the computer. The computer may include programming to operate one or more of vehicle brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer, as opposed to a human operator, is to control such operations. Additionally, the computer may be programmed to determine whether and when a human operator is to control such operations. The computer may include or be communicatively coupled to, e.g., via a vehicle network such as a communications bus as described further below, more than one processor, e.g., included in components such as sensors, electronic control units (ECUs) or the like included in the vehicle 12. The computer is generally arranged for communications on a vehicle communication network that can include a bus in the vehicle 12 such as a controller area network CAN or the like, and/or other wired and/or wireless mechanisms. Alternatively or additionally, in cases where the computer actually comprises a plurality of devices, the vehicle communication network may be used for communications between devices represented as the computer in this disclosure. Further, as mentioned below, various controllers and/or sensors may provide data to the computer via the vehicle communication network.

The vehicle 12 may include at least one impact sensor for sensing impact of the vehicle 12. The impact sensor is in communication with the computer. The computer may activate the pyrotechnic actuator 26, e.g., provide an impulse to a pyrotechnic charge of the pyrotechnic actuator 26 when the impact sensor senses an impact of the vehicle 12. Alternatively, or additionally to sensing impact, the impact sensor may be configured to sense impact prior to impact, i.e., pre-impact sensing. The impact sensor is configured to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor may be located at numerous points in or on the vehicle 12.

The vehicle 12 includes a communication network that can include a bus in the vehicle 12 such as a controller area network (CAN) or the like, and/or other wired and/or wireless mechanisms. Via the vehicle network, the computer may transmit messages to various devices in the vehicle 12 and/or receive messages (e.g., CAN messages) from the various devices, e.g., sensors, an actuator, a human machine interface (HMI), etc. Alternatively or additionally, in cases where the computer actually comprises a plurality of devices, the vehicle communication network may be used for communications between devices represented as the computer in this disclosure. Further, as mentioned below, various controllers and/or sensors may provide data to the computer via the vehicle communication network The disclosure has been described in an illustrative manner, and it is to be understood that the terminology which has been used is intended to be in the nature of words of description rather than of limitation. Numerical adjectives "first," "second," etc., are used herein merely as identifiers and do not indicate order or importance. Many modifications and variations of the present disclosure are possible in light of the above teachings, and the disclosure may be practiced otherwise than as specifically described.

What is claimed is:

1. An assembly comprising:
    a vehicle body including a sill and a pillar extending upwardly from the sill defining a door opening;
    a member rotatably supported by the sill and being rotatable relative to the sill from an undeployed position to a deployed position;
    a linkage rotatably supported by the pillar and the member; and
    a pyrotechnic actuator supported by the vehicle body and connected to the member.

2. The assembly as set forth in claim 1, wherein the member is recessed relative to the door opening in the undeployed position and is across the door opening in the deployed position.

3. The assembly as set forth in claim 2, wherein the linkage is recessed relative to the door opening in the undeployed position and is across the door opening in the deployed position.

4. The assembly as set forth in claim 2, further comprising a second member rotatably coupled to the sill and being rotatable relative to the sill from an undeployed position to a deployed position, the second member being recessed relative to the door opening in the undeployed position and being across the door opening in the deployed position.

5. The assembly as set forth in claim 4, wherein the first member and the second member engage each other in the deployed position.

6. The assembly as set forth in claim 4, wherein the vehicle body includes a second pillar extending upward from the sill and spaced from the pillar, and further comprising a second linkage rotatably connected to the second pillar and rotatably coupled to the second member, the linkage and the second linkage being recessed relative to the door opening in the undeployed position and being across the door opening in the deployed position.

7. The assembly as set forth in claim 4, further comprising a second pyrotechnic actuator supported by the vehicle body and connected to the second member.

8. The assembly as set forth in claim 6, wherein:
    the linkage includes a link and another link extending from the link to the member; and
    the second linkage includes a second link and another link extending from the second link to the second member.

9. The assembly as set forth in claim 4, wherein one of the member and the second member includes a tongue and the other of the member and the second member includes a groove spaced from the tongue in the undeployed position and receiving the tongue in the deployed position.

10. The assembly as set forth in claim 1, wherein the linkage includes a link and another link extending from the link to the member.

11. The assembly as set forth in claim 1, further comprising a spring-loaded lock operable to lock the member relative to the sill in the deployed position.

12. The assembly as set forth in claim 1, further comprising a pin abutting the member and a spring biases the pin toward the member in the undeployed position.

13. The assembly as set forth in claim 1, further comprising a base supported by the vehicle body, the member being rotatably connected to the base.

14. The assembly as set forth in claim 13, wherein the base includes a bottom and a plurality of walls extending upward from the bottom defining a cavity housing the member in the undeployed position.

15. The assembly as set forth in claim 13, wherein the base includes a ledge and the member includes a brace spaced from the ledge in the undeployed position and abutting the ledge in the deployed position.

16. The assembly as set forth in claim 15, wherein the member includes a body rotatably engaged with the base and the brace is vehicle-inboard of the body.

17. The assembly as set forth in claim 13, further comprising a pin rotatably connecting the member to the base.

* * * * *